United States Patent [19]

O'Neill

[11] Patent Number: 4,746,493

[45] Date of Patent: May 24, 1988

[54] WAVEGUIDE REACTION CELL

[76] Inventor: James A. O'Neill, 24 Mabelle Avenue, Apt. 2707, Toronto, Ontario, Canada, M9A 4X8

[21] Appl. No.: 907,245

[22] Filed: Sep. 15, 1986

Related U.S. Application Data

[62] Division of Ser. No. 743,084, Jun. 10, 1985, Pat. No. 4,622,115.

[51] Int. Cl.$^4$ .......................... B01J 1/10; B01K 1/00
[52] U.S. Cl. ............................ 422/186; 204/DIG. 11
[58] Field of Search ................. 204/157.41, 157.61, 204/157.22, DIG. 11; 422/186

[56] References Cited

U.S. PATENT DOCUMENTS

| | | | |
|---|---|---|---|
| 3,969,204 | 7/1976 | Neimann et al. | 422/186 X |
| 4,012,301 | 3/1977 | Rich et al. | 422/186 X |
| 4,397,823 | 8/1983 | Dimpfl | 422/186 X |
| 4,545,878 | 10/1985 | Bridges | 422/186 X |
| 4,668,647 | 5/1987 | Rice et al. | 204/157.41 X |

Primary Examiner—John F. Terapane
Assistant Examiner—Susan Wolffe

[57] ABSTRACT

A process for inducing photochemical reactions using laser radiation employs a dielectric waveguide cell formed by a capillary passage communicating at its ends with a gas inlet chamber and a gas outlet chamber, each chamber being configured to encompass a cone of laser radiation focussed onto, or diverging from, the respective end of the capillary passage. The passage is configured to propagate the laser radiation therealong in one or more selected waveguide modes, thus defining an extended region of high fluence.

5 Claims, 2 Drawing Sheets

WAVEGUIDE REACTION CELL

REFERENCE TO RELATED APPLICATION

This application is a divisional of Ser. No. 743,084 filed on June 10, 1985, now U.S. Pat. No 4,622,115 entitled "Photochemical Process Using A Waveguide Reaction Cell".

FIELD OF THE INVENTION

This invention relates to a process for inducing photochemical reactions in gases using laser radiation, and to a waveguide reaction cell to be used in such a process.

BACKGROUND OF THE INVENTION

The economical manufacture of chemicals using photochemical reactions induced by laser radiation as one of the production steps is a very active field of research. Although laser energy is currently expensive by comparison with thermal energy, the high degree of control over the reaction products possible with photochemical reactions means that for high value products such as isotopes or pharmaceuticals use of such reactions may be an economical method of production. A fundamental concern in the design of a plant using laser induced photochemical reactions is the design of the reaction cell where the photochemical reactions take place.

Conventional reaction cells are of three main types, those which use free space focussed radiation, those with conducting walls, and equifluence cells. The simplest design for a reaction cell for photochemical reactions which require a fluence in excess of the damage threshold of available window materials is one utilizing free space focussed radiation. In this design, the laser beam enters the cell as a converging beam of large diameter, reaches a focus within the cell and then diverges again before leaving the cell through the exit window. The drawbacks of these cells are:

(a) Only a small volume of the cell around the focus is exposed to high fluence before the beam diverges again, leading to a small yield/pulse.

(b) The long path length through the cell before reaching the high fluence region where photochemical reactions take place compared to the short path length within the high fluence region means that the yield/photon is also small.

(c) Because of the small yield per pulse, multipulse irradiations are required to induce photochemical reactions in a large fraction of the material in the cell. During multipulse irradiations, secondary reactions (photochemical or otherwise) can occur which interfere with the desirable primary reactions taking place.

The use of a waveguide with conducting walls has been reported previously. The drawbacks of such cells are the expense involved in coating the cell wall with a suitable material such as gold, the high probability of reactions between metal surfaces and the process gas or the photochemical reaction products, and the ease with which such surfaces can be degraded by dirt, requiring time consuming cleaning or recoating procedures.

Another problem is the extreme difficulty of using a metal waveguide for the purpose without suffering high losses. A circular section waveguide will propagate radiation in three modes: circular electric, circular magnetic, and hybrid in the case of a metal waveguide the circular magnetic and the hybrid modes are high loss hodes, and so only the circular electric mode is usable. However, the circular electric mode is extremely difficult to couple to free space radiation and its application to the process described herein would be uneconomic because of the high coupling loss that would be encountered in practice.

For any photochemical reaction there is generally an optimal fluence (laser energy per unit area). Reaction cells have been proposed which achieve a close approximation to this optimal fluence throughout their volume; such cells are called equifluence cells. Although equifluence cells can achieve close to the theoretical maximum efficiency, their use has a number of drawbacks:

(a) The mirrors used in equifluence cell design have complex aspheric geometries. Such mirrors are costly to manufacture.

(b) The design of equifluence cells generally requires that the aspheric mirrors are in contact with the process gas. Reactions between the process gas or photochemical reaction products and the mirror material can then lead to a reduced lifetime for these mirrors.

(c) If the cell is to be truly equifluence, the mirrors must be exposed to the same fluence as the process gas. If this fluence is high (as would be required for instance in a process to remove $CF_3T$ from $CF_3H$ by multiphoton dissociation using a $CO_2$ laser), there may be no materials available which can be exposed to this fluence without damage.

The present invention provides a relatively simple, inexpensive waveguide reaction cell which largely overcomes the drawbacks discussed above and offers significant advantages over existing designs. The invention also provides a process for inducing photochemical reactions in gases using laser radiation, which is made possible by the use of such a cell.

SUMMARY OF THE INVENTION

According to the invention a reaction cell for use in the process comprises dielectric means defining an elongated passage of uniform cross section throughout its length, the passage communicating at its ends with a gas inlet chamber and a gas outlet chamber, respectively, and defining a capillary gas flow path therebetween, each said chamber having a window transparent to laser radiation and being configured to encompass a cone of laser radiation propagated between the window and the end of said passage, said passage-defining means being configured to propagate the laser radiation along said passage in one or more selected waveguide modes, a gas inlet to the gas inlet chamber, and a gas outlet to the gas outlet chamber.

BRIEF DESCRIPTION OF THE DRAWINGS

A preferred embodiment of the invention will now be described, by way of example, with reference to the accompanying drawings. In the drawings.

DESCRIPTION OF THE PREFERRED EMBODIMENT

Figure 1:
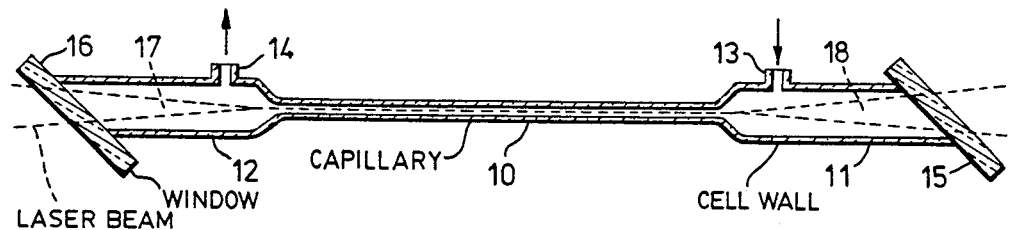
FIG. 1 is a longitudinal sectional view of a dielectric waveguide cell according to the invention.

Referring to FIG. 1, the waveguide reaction cell comprises an elongate capillary tube 10 defining a gas flow passage of uniform circular cross section throughout its length and communicating at its ends with a gas inlet chamber 11 and a gas outlet chamber 12. The walls of the chambers 11 and 12 are formed by extensions of the wall of the capillary tube 10, the wall and its extensions being of inert dielectric material such as glass, silica or beryllium oxide. When the cell is in use, gas flows via an inlet 13 to the gas inlet chamber 11, along the capillary passage which may be about 1 mm. in diameter, and into the chamber 12, which has a gas outlet 14.

The chambers 11,12 are each provided with an end window 15,16 respectively, the windows being of a material such as sodium chloride which is transparent to the laser radiation with which the gas flowing through the capillary passage is irradiated. As shown in FIG. 1, the windows 15 and 16 are inclined to the axis of the capillary passage.

The chamber 12 is configured so that a convergent cone of laser radiation 17 entering via the window 16, coaxially with the capillary passage, can be focussed onto the end of the passage. Similarly, radiation exiting from the other end of the capillary passage diverges as a cone 18 and is transmitted by the window 15. Between the ends of the capillary passage the radiation is propagated in one or more selected waveguide modes. Thus, the capillary passage along which the gas to be irradiated flows is an extended region of high fluence. The particular advantages of the cell over conventional cells may be summarized as follows:

(i) The high fluence volume is greatly increased, leading to increased yields per laser pulse.

(ii) The path length through the high fluence region is greater than that between the windows and the ends of the waveguide, decreasing the fraction of the photons absorbed which are wasted in regions where dissociation does not occur.

(iii) By flowing the gas through the waveguide, secondary photolysis is reduced.

Theoretical Considerations

Figure 2:
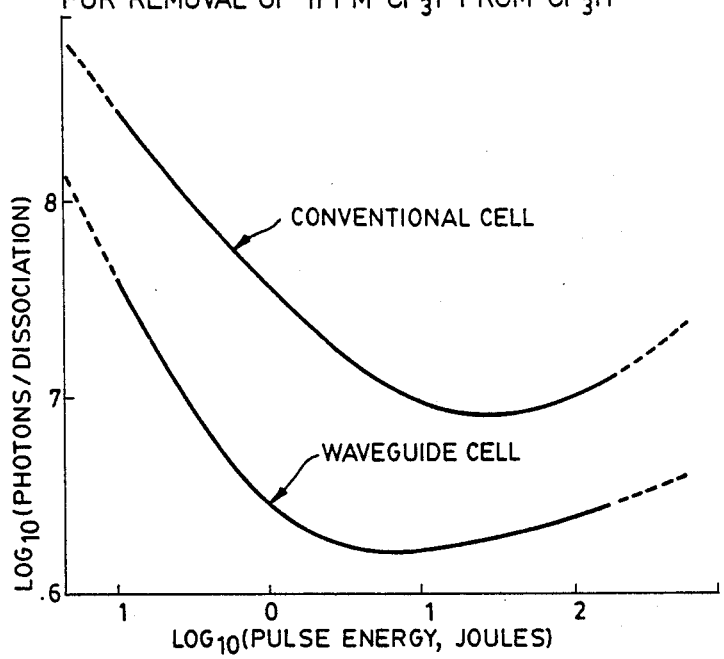
FIG. 2 is a graph showing a comparison between calculated yields from a cell according to the invention and a conventional cell.

As an illustration of the decreases in photon consumption per molecule dissociated with capillary waveguide dissociation cells, FIG. 2 shows a comparison between calculated yields from cells using the invention and conventional cells. The curves A and B shown are for removal of 1 ppm $CF_3T$ from a 50 torr $CF_3H$ sample. The assumptions made in deriving these curves are tabulated in Table 1. Over the range in laser pulse energies studied, (0.01 to 200 Joules) the number of photons consumed per molecule dissociated is between 5 and 10 times less in the waveguide cell than in a conventional cell.

TABLE 1

Assumptions for Theoretical Comparisons of Yield/Photon in $CF_3T$ Dissociation

| Common | |
|---|---|
| Laser Wavelength | 9.2 μm |
| Laser Pulse Length | 80 ns |
| Window Damage Threshold | 10 J/cm² |
| Window Transmission | 95% |
| Threshold for Dielectric Breakdown of $CF_3H$ | 100 J/cm² |

TABLE 1-continued

Assumptions for Theoretical Comparisons of Yield/Photon in $CF_3T$ Dissociation

| | |
|---|---|
| Absorption Coefficient of $CF_3H$ | $3.17 \times 10^{-6}$ torr-cm |
| Pressure of $CF_3H$ in Dissociation Cell | 50 torr |
| Concentration of $CF_3T$ in $CF_3H$ | 1 ppm |
| Threshold Fluence for $CF_3T$ Dissociation | 65 J/cm² |
| Conventional Cell | |
| Radiation Mode | $TEM_{oo}$ |
| Cell of the Present Invention | |
| Radiation Mode | $EH_{11}$ |
| Coupling Coefficient, Waveguide/Free Space | 98% |
| Losses to Waveguide Walls | $\dfrac{1.5 \times 10^{-6} \text{ cm}^2}{(\text{Waveguide Radius})^3}$ |

Modes and Coupling

The waveguide mode which couples most efficiently with $TEM_{oo}$ free space radiation is the lowest order hybrid mode $EH_{11}$. This mode is linearly polarized, and the electric field is dependent on radial distance from the waveguide axis only according to the formula:

$$E_x = E_o J_o(ur/a)$$

where $E_o$ is the electric field strength on axis, $J_o$ is the zeroth order Bessel function, r is the radial coordinate, a is the waveguide radius and u is the first solution of the equation:

$$J_o(u) = 0$$

Free space $TEM_{oo}$ (Gaussian) laser radiation is also linearly polarized and has the following electric field distribution:

$$E_x = E_o e^{-r^2/w^2}$$

The exact solution of the free space mode-waveguide mode coupling problem would require the use of Maxwell's equations to trace the evolution of the radiation from the incident $TEM_{oo}$ mode far from the waveguide, through a transition region around the entrance to the waveguide, to the transmitted $EH_{11}$ mode in the waveguide far from the entrance. An approximate solution to this problem is available. In this study, the coupling of the modes is estimated by calculating the "overlap integral" between their electric field distributions:

Coupling coefficient =

$$\sqrt{\dfrac{2}{\pi}} \cdot \dfrac{1}{w_o} \int_0^a J_o(ur/a) \exp(-r^2/w_o^2) 2\, rdr$$

The value of $w_o/a$ which optimizes this coupling coefficient is $w_o/a = 0.6435$. Surprisingly, 98% of the incident energy in the $TEM_{oo}$ mode is estimated to couple to the $EH_{11}$ mode when this condition is met. Studies using cw-$CO_2$ laser radiation have indicated that this high coupling efficiency can also be realized in practice. The present applicant's experience using pulsed $CO_2$ laser radiation focussed in such a way that $w_o/a = 0.55$ (the closest approximation to 0.6435 with the optics available) is that approximately 90% of the incident energy is coupled into the waveguide.

Alignment

Figure 3:
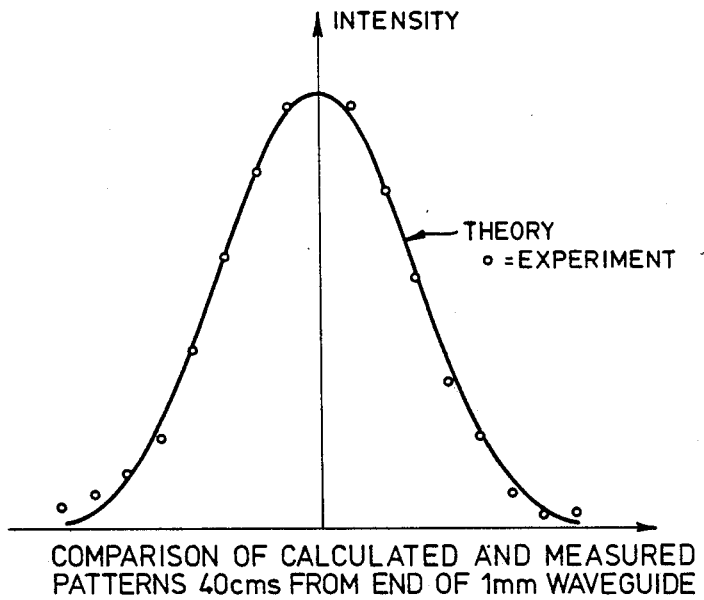
FIG. 3 is a graph showing a comparison between experimental and calculated diffraction patterns depending upon coupling alignment.

Gross adjustment of the alignment of the incident laser beam with the waveguide can be made by observing the radiation transmitted through the waveguide on a carbon block for multiple spots, circular symmetry, etc. More quantitative tests of alignment can be made by measuring the intensity distribution in the transmitted radiation by measuring the energy transmitted through a pinhole with a pyroelectric detector as the pinhole is scanned across the beam. The results of such an experiment with my apparatus are shown in FIG. 3. Good agreement is found between the experimental data, indicated by circles, and a theoretical calculation, indicated by the continuous curve, of the diffraction pattern resulting from a pure $EH_{11}$ mode emerging from the waveguide. The small differences observed (an apparently narrower central peak and broader wings in the experimental data) can be explained by the assumption made in the theoretical calculation that the waveguided radiation is pure $EH_{11}$ at the moment of its exit from the waveguide.

The Gas Handling System

A fundamental problem in the experimental apparatus originally developed to test the efficiency of the present invention was the gas handling system. The gas handling system was required to provide constant flow rates of the order of 10 mL/min at gas pressures between 1 and 100 torr, and to maintain constant pressure and flow rate during experimental runs lasting several hours. This problem was considerably simplified by the adoption of the liquid displacement system shown in FIG. 4.

Figure 4:
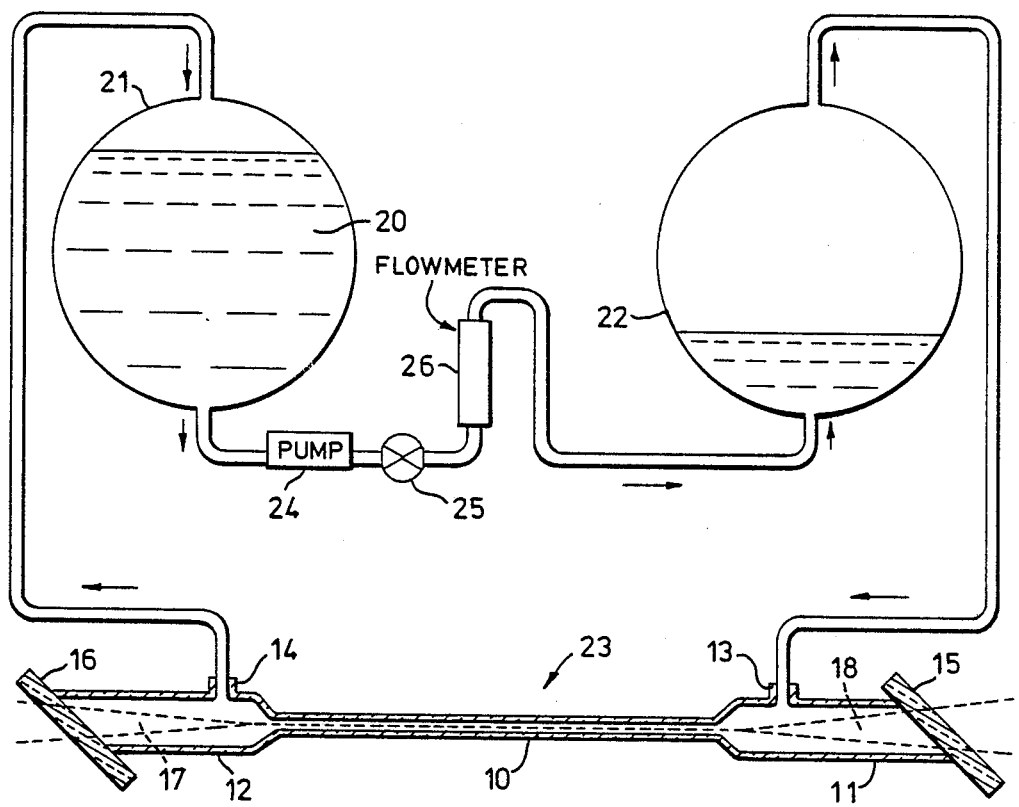
FIG. 4 is a diagrammatic illustration of an apparatus used in carrying out the process of the invention.

As illustrated in FIG. 4, an inert liquid 20 is pumped from a container 21 into a container 22, thereby displacing a gas to be irradiated from the container 21, via the waveguide reaction cell 23, into the container 21. The gas is caused to flow through the capillary passage 10 under constant pressure and at a constant flow velocity. This is achieved by providing a flow line between the containers 21,22 a liquid pump 24, a needle valve 25 and a flowmeter 26, the needle valve being controlled to adjust the flow rate should the flowmeter indicate any changes in flow rate. The liquid must, of course, be compatible with the gas.

Initial tests of the waveguide cell were done using selective multiphoton dissociation of $CF_3D$ in $CF_3D$ mixtures as a test molecule. 2.5 liter samples of $CF_3H$ containing $CF_3D$ at the natural level (145.4 ppm) were passed through a 20 cm waveguide cell. The gas flow rate was set so that at the laser repetition frequency used (5 Hz), a molecule flowing at the average flow velocity in the waveguide would experience two laser shots before passing out of the waveguide. Since the flow in the capillary is laminar, the fastest molecules (those at the centre of the waveguide) will have a peak velocity exactly twice the average. Consequently, this choice of flow rates ensures that even the fastest flowing molecules are exposed to at least one laser pulse before leaving the capillary.

TABLE II

Multiphoton Dissociation Yields for Removal of $CF_3D$ From 2.5 Liter Samples of Natural Deuterium Content Trifluoromethane In a Waveguide Cell

| Pressure (torr) | Pulse Energy (mJoule) | PPM 'D' Removed* (±3.8 ppm) | Enhancement Factor Over Conventional Cell |
|---|---|---|---|
| 60 | 75 | 19.5 | 9 |
|    | 59 | 8.2 | 15 |
|    | 51 | 4.7 | 160 |
| 30 | 75 | 24.9 | 5 |
|    | 63 | 19.9 | 7 |
|    | 56 | 14.6 | 8 |
|    | 41 | 6.8 | 82 |
| 15 | 76 | 22.6 | 3 |
|    | 63 | 20.0 | 4 |
|    | 55 | 14.4 | 5 |
|    | 45 | 12.9 | 10 |

*Natural 'D' concentration measured in $CF_3H$ = 145.4 ppm.

The results of these measurements of $CF_3D$ removal from $CF_3H$ are shown in Table II. In every case studied, the yields measured show a large enhancement over yields estimated for conventional cells using extrapolations of data taken previously in the laboratory.

What is claimed is:

1. A waveguide reaction cell for promoting photochemical reactions in gases, comprising dielectric means defining an elongated passage of uniform cross section throughout its length, the passage communicating at its ends with a gas inlet chamber and a gas outlet chamber, respectively, and defining a capillary gas flow path therebetween, each said chamber having a window transparent to laser radiation and being configured to encompass a cone of laser radiation of increasing fluence from the window to the adjacent end of said passage, said passage-defining means being configured to propogate a selected fluence of the laser radiation along said passage in one or more selected waveguide modes, a gas inlet to the gas inlet chamber, and a gas outlet to the gas outlet chamber.

2. A waveguide reaction cell according to claim 1, wherein the passage-defining means is a capillary tube of circular cross section of inert dielectric material.

3. A waveguide reaction cell according to claim 2, wherein the capillary tube is of glass.

4. A waveguide reaction cell according to claim 2, wherein the capillary tube is of silica.

5. A waveguide reaction cell according to claim 2, wherein the capillary tube is of beryllium oxide.

* * * * *